No. 649,684. Patented May 15, 1900.
J. W. TROUTMAN.
FEED COOKER.
(Application filed Nov. 13, 1899.)
(No Model.)
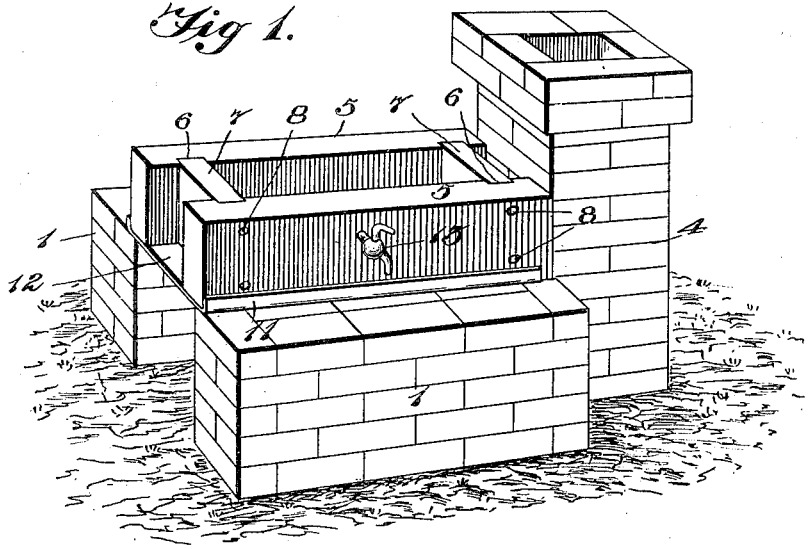
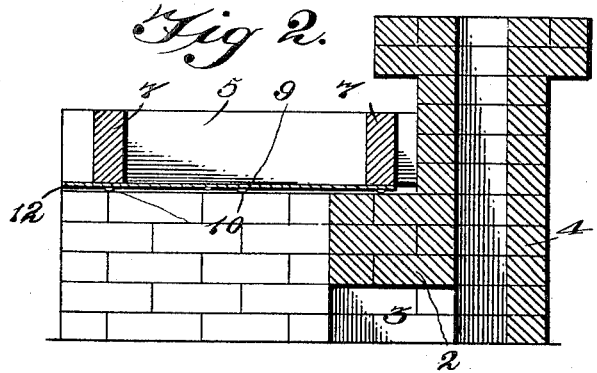
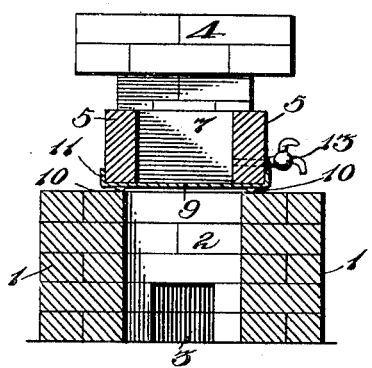
Witnesses
John Maupin
Inventor
By his Attorneys, James W Troutman
C A Snow & Co.

UNITED STATES PATENT OFFICE.

JAMES W. TROUTMAN, OF FLINTSTONE, MARYLAND.

FEED-COOKER.

SPECIFICATION forming part of Letters Patent No. 649,684, dated May 15, 1900.

Application filed November 13, 1899. Serial No. 736,802. (No model.)

*To all whom it may concern:*

Be it known that I, JAMES W. TROUTMAN, a citizen of the United States, residing at Flintstone, in the county of Allegany and State of Maryland, have invented a new and useful Feed-Cooker, of which the following is a specification.

This invention relates to feed-cookers, and is especially designed for cooking vegetables for stock and poultry, and is furthermore designed to provide a light and durable device having means for protecting the sides and ends thereof against damage by the heat and flames of a fire.

To these ends the present invention consists in the combination and arrangements of parts, as will be hereinafter more fully described, shown in the accompanying drawings, and particularly pointed out in the appended claim, it being understood that changes in the form, proportion, size, and minor details may be made within the scope of the appended claim without departing from the spirit or sacrificing any of the advantages of the invention.

In the drawings, Figure 1 is a perspective view of the improved cooker applied to an open fireplace. Fig. 2 is a longitudinal sectional view thereof. Fig. 3 is a transverse sectional view.

Corresponding parts in the several figures of the drawings are designated by like characters of reference.

In order that the present invention may be fully understood, I have shown in the drawings an open fireplace, with which the cooking utensil is designed for use. This fireplace is located in the open air, as is common, and preferably comprises opposite side walls 1, formed of brick or stone, and the rear end wall 2, the space inclosed by these walls forming a fire-box, which is open at its front end and upper side. A suitable flue-opening 3 is formed through the lower side of the end wall 2 and communicates from the fire-box to the flue of a chimney 4, built at the rear end of the fireplace and extending a suitable distance thereabove.

As clearly illustrated in the drawings, the present cooking utensil rests upon the upper sides of the walls of the fireplace and spans the upper open side of the fire-box. In order that the cooker may combine lightness with strength, I form the same with opposite longitudinal wooden side pieces 5, preferably rectangular in shape and provided upon their inner sides with notches or mortises 6. These mortises extend across the entire width of the side pieces and are located inward from the respective ends thereof, the adjacent mortises of the opposite side pieces being alined transversely of the cooker. The end pieces 7 are also of wood and of rectangular shape, having their opposite ends fitting snugly the respective mortises, and this frame structure is firmly secured by means of suitable fastenings 8, driven through the respective side pieces and into the adjacent edges of the end pieces. By this arrangement the end pieces are located inward from the adjacent ends of the side pieces for a purpose as will be hereinafter described. The bottom of the cooker is formed by a single piece of sheet metal 9, which is secured to the lower edges of the side and end pieces by means of suitable fastenings 10, and the longitudinal edges of the bottom are bent upwardly, so as to form flanges 11, snugly embracing the outer sides of the respective side pieces. As clearly indicated in Figs. 1 and 2 of the drawings, it will be seen that the bottom is provided at one end with a longitudinal extension 12, extending to or beyond the adjacent ends of the side pieces and spanning the space between the latter and exteriorly of the adjacent end piece.

A suitable faucet 13 is provided in one of the sides of the cooker, so as to conveniently draw off the liquid contents thereof.

From the showing made in the drawings it will be apparent that the cooker is of a size to entirely cover the upper open side of the fireplace, having its rear end resting upon the rear wall 2 and its front end extending to the open front end of the fireplace. Thus the outer or front end piece 7 is protected against damage from the heat and the flames which may pass outwardly and upwardly through the open end of the fireplace by means of the extension 12 of the metallic bottom, as will be understood. The opposite ends of the cooker may each be provided with a protecting bottom extension, if so desired; but it is not essential that the rear end be thus equipped, as the latter rests upon the rear wall of the fireplace and therefore is not subject to damage by the flames.

As hereinbefore set forth, the side and end pieces are to be formed of wood or other heat-non-conducting material in order that the receptacle may be conveniently handled without burning the hands of the attendant. Also the bottom plate is formed of metal, so as to conduct heat to the contents of the receptacle, and is provided with the end projection and the side flanges, so as to prevent the side and end pieces from being charred by the flames which may lick up around the lower edges of the receptacle. In this connection it will be observed that the heads of the fastenings 10 project beyond the bottom plate, so as to form feet or supports therefor to prevent wear of the plate, and thus the bottom of the device is spaced slightly above the upper walls of the furnace, whereby it is possible, and, in fact, frequently happens, that the flames lick up about the sides of the device, and therefore the flanges 11 have been provided to prevent the charring of the wooden side pieces, as hereinbefore set forth.

What I claim is—

The combination with a heater having an open top and an open end, of a cooking-receptacle comprising heat-non-conducting side and end walls, and a heat-conducting metallic bottom plate, which projects beyond one end of the receptacle and also at the open end of the heater, the opposite longitudinal edges of the bottom plate being provided with upstanding flanges embracing the respective outer faces of the heat-non-conducting sides to prevent charring of the latter, and headed fastenings passing through the bottom plate and into the bottom edges of the side and end pieces, the heads of the fastenings projecting beyond the bottom plate to form feet or supports to rest upon the top of the heater.

In testimony that I claim the foregoing as my own I have hereto affixed my signature in the presence of two witnesses.

JAMES W. TROUTMAN.

Witnesses:
C. H. ROBINETTE,
H. C. ROBINETTE.